Aug. 3, 1965     R. H. DAVIES     3,197,958
FUEL SELECTOR AND FLOW DIVIDER VALVE AND CONTROL
MEANS FOR JET ENGINES
Filed Oct. 11, 1961     2 Sheets-Sheet 1
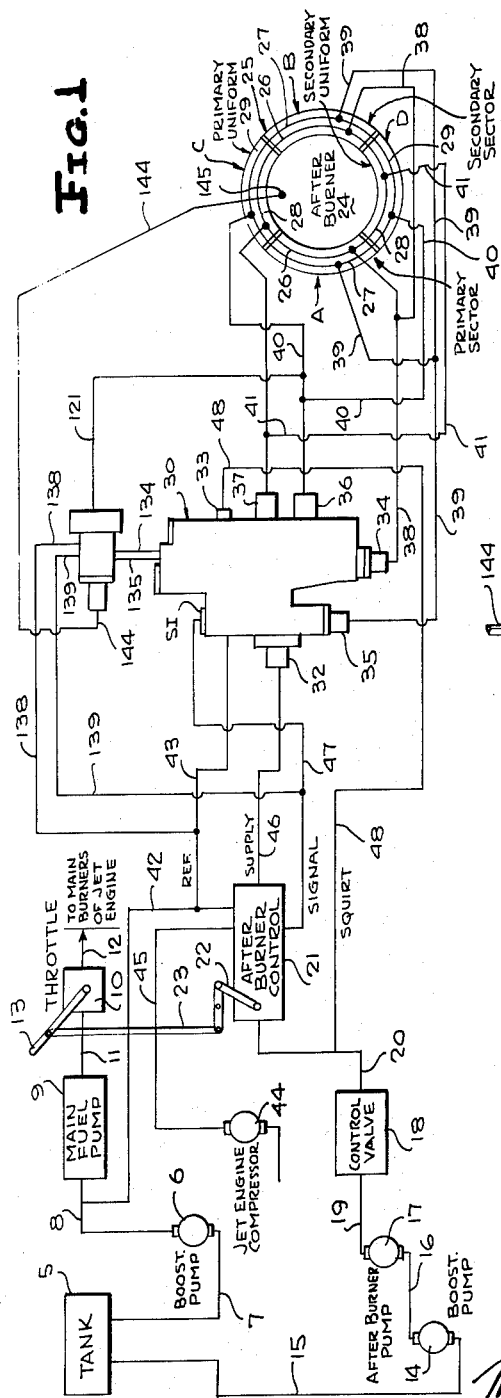
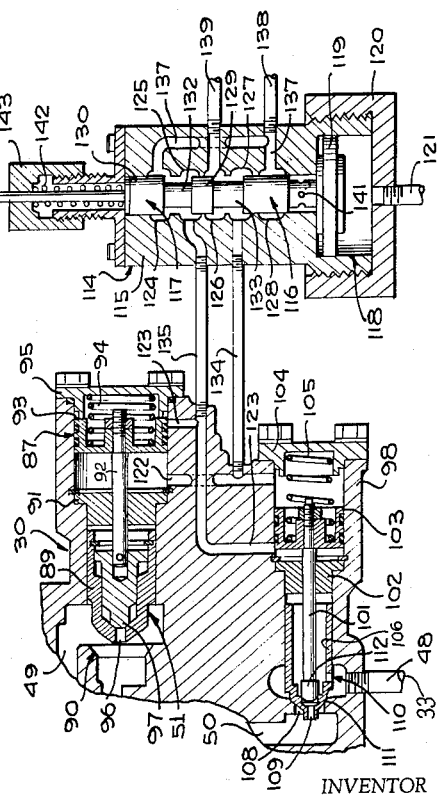
INVENTOR
ROBERT H. DAVIES
ATTORNEYS

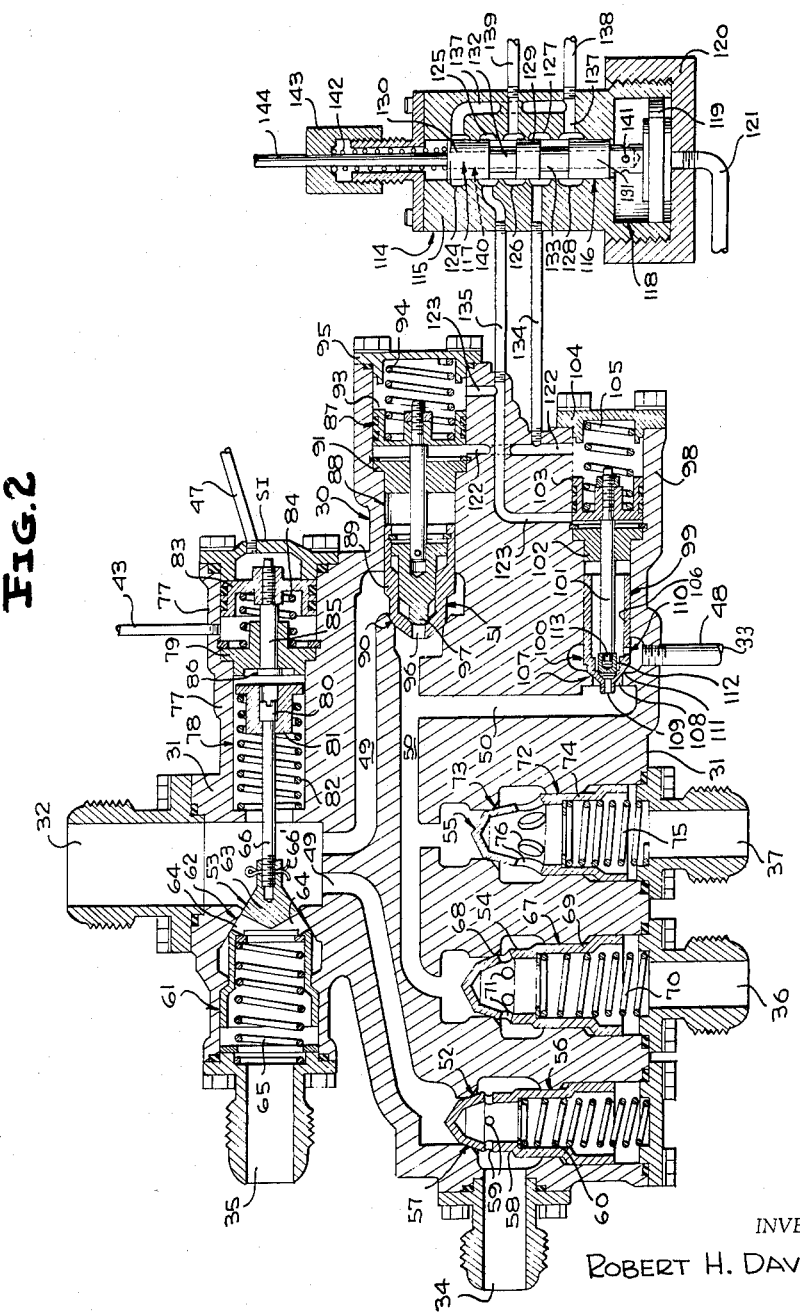

United States Patent Office
3,197,958
Patented Aug. 3, 1965

3,197,958
FUEL SELECTOR AND FLOW DIVIDER VALVE AND CONTROL MEANS FOR JET ENGINES
Robert H. Davies, Aurora, Ohio, assignor to Parker-Hannifin Corporation, Cleveland, Ohio, a corporation of Ohio
Filed Oct. 11, 1961, Ser. No. 144,330
17 Claims. (Cl. 60—35.6)

The invention relates generally to fuel-flow control systems for jet engines of the type having a main burner section and a divided afterburner section, and more particularly to fuel selector and flow divider valve and control means for dividing and scheduling the flow of fuel into the afterburner manifolds of a jet engine, and it primarily seeks to provide a novel arrangement effective to assure against "flame out" due to introduction into the manifolds of too much or too little fuel, resulting in too rich or too lean a mixture.

It is well known that two separate control devices are provided for controlling the flow of fuel to the main burners and the afterburner of a jet engine, and that these control devices are connected together by linkage for operation through a single control means. In such systems, when the control throttle is initially opened, fuel is delivered only to the main burners of the jet engine, and when the throttle is opened beyond a certain point, the second control device is actuated to cause and control the flow of fuel to the afterburner. In such known equipments the fuel selector and flow divider valve which divides and schedules the flow of fuel into the afterburner manifold of a jet engine normally has a single fuel supply line, and since the individual lines leading to the afterburner manifold and the sections and manifolds thereof from the valve are emptied to a greater or lesser degree after each operation of the valve, when fuel is supplied to additional sections and their manifolds, there is a tendency for the pressure within the valve, and thus the pressure delivered to a previously operating section of the afterburner to be momentarily and objectionably decreased. In an attempt to overcome this problem it has been proposed to provide squirt valve means operable in timed relation to the opening of additional passages within the fuel selector and flow divider valve to squirt fuel under high pressure into the connected portion of the fuel selector and flow divider valve, and thus into the empty manifolds wherein no flow presently is taking place, but will immediately take place, so that when additional passages leading from the fuel selector and flow divider valve are opened, there will be no momentary drop in pressure within the fuel selector and flow divider valve and the passages previously opened to the afterburner such as might result in interruption of combustion and "flame out."

Such measures have not proven entirely satisfactory in the intended prevention of "flame out" because the demand for filling of manifold portions will vary and there has been no way of controlling the period of duration of the squirting in of fuel in accordance with said varying demand. It will be apparent that a fuel squirting period of predetermined duration may be adequate under certain conditions of fill of the manifolds and inadequate under other conditions of fill, and thus could bring about a "flame out" condition by reason of improper fuel supply, as before stated. Therefore, it is a primary object of the invention to provide novel control arrangement of the character stated including novel means for initiating a fuel squirting cycle and automatically controlling its duration in accordance with the degree of fill in a manifold portion at the time the squirt is initiated, thus also to always terminate the squirting in of fuel when the manifold reaches the full stage regardless of how large or small the fraction of full squirt period or cycle required to accomplish the manifold filling purpose.

Another object of the invention is to provide in a fuel selector and flow divider arrangement of the character stated a novel fuel squirting control wherein the squirt cycle is responsive to pressure in the manifolds, thereby to have the squirt cycle extend only over the interval necessary to fill the manifolds, not underfill or overfill the same.

A further object of the invention is to provide a squirt cycle control means of the character stated wherein a piston operated control valve is employed the piston in which is acted upon by manifold pressure to position the control valve for directing signal pressure to bring about a fuel insquirting action of the squirt valve, and by tail pipe pressure to position said control valve to so control the pressure direction as to discontinue the squirt cycle.

With the above and other objects in view that will hereinafter appear, the nature of the invention will be more clearly understood by reference to the following detailed description, the appended claims, and the several views illustrated in the accompanying drawings.

In the drawings:

FIGURE 1 is a schematic showing of the general arrangement of the various components of a fuel-flow control system for a jet engine and which embodies the invention.

FIGURE 2 is a sectional view through the fuel selector and flow divider valve and the associated manifold pressure controlled squirt control valve, the latter being shown as positioned for directing signal pressure in a squirt valve opening direction.

FIGURE 3 is a fragmentary sectional view illustrating the control valve as manifold pressure actuated to direct signal pressure in a squirt valve closing direction.

A typical installation for utilizing the present invention is schematically illustrated in FIGURE 1, wherein the fuel supply tank for the jet engine is referred to by the numeral 5. A booster pump 6 is connected to the tank 5 by a fuel line 7. A fuel line 8 connects the booster pump 6 to a main fuel pump 9. The main fuel pump 9 delivers fuel to a control valve 10 through a fuel line 11. A fuel line 12 extends from the control valve 10 to the main burners (not shown) of the jet engine. The opening of the control valve 10 is controlled by a throttle lever 13 suitably connected thereto.

A second booster pump 14 is connected to the fuel supply tank 5 by a fuel line 15. A fuel line 16 connects the booster pump 14 to the afterburner pump 17. A pressure control valve 18 is connected to the afterburner pump 17 by a fuel line 19. A fuel line 20 is connected to the control valve 18 at one end, and to an afterburner control device 21 at the other end thereof. The afterburner control device 21 is actuated by a lever 22 which is connected to the throttle lever 13 by means of suitable linkage 23.

The jet engine also includes an afterburner 24 which has a manifold 25. The manifold 25 is circumferentially divided into four sections, A, B, C, and D, A and B being referred to as "sectors" and C and D being referred to as "uniforms," and each of which has primary and secondary fuel manifolds through which fuel is sprayed into the afterburner. Under low fuel flows to the afterburner, fuel is supplied first to opposite sectors A and B through primary manifold portions 26 and then additionally through secondary manifold portions 27. This is known as "sector" burning since only two of the four sections are being utilized. With further increased flow to the afterburner, fuel is delivered to uniforms C and D, as well as to sectors A and B, first through the primary manifold portions 28 and then additionally through secondary manifold portions 29. Operation of all four ports sectors is known as "uniform" burning.

A fuel selector and flow divider valve, generally referred to by the numeral 30, is provided for selectively supplying fuel at predetermined pressures to the various portions of the afterburner manifold 25. The fuel selector and flow divider valve 30 includes a housing 31 which has a fuel supply inlet 32, a squirt inlet 33, and a signal inlet fitting SI. The housing 31 also includes a primary sector outlet 34, a secondary sector outlet 35, a primary uniform outlet 36, and a secondary uniform outlet 37. The primary sector outlet 34 is connected to the primary sectors 26 by fuel lines 38. Fuel lines 39 connect the secondary sector outlet 35 to the secondary sectors 27. The primary uniform outlet 36 is connected to the primary uniforms 28 by fuel lines 40. Fuel lines 41 connect the secondary uniform outlet 37 to the secondary uniforms 29.

A line 42 with a reference pressure of 20 to 30 p.s.i. therein extends from the fuel line 8 to the afterburner control device 21 and primarily serves as a return line for any fuel which may bypass the elements within the afterburner control device 21, the fuel being at a pressure of 765 to 785 p.s.i. Another reference line 43 extends between the reference line 42 and the housing as shown in FIGS. 1 and 2 for a purpose to be described hereinafter.

The jet engine includes a compressor 44 which is connected by means of a line 45 to the afterburner control device 21. The pressure from the compressor 44 acts upon the afterburner control device, together with the action of the lever 22, to vary the flow rate of fuel flowing from the afterburner control device 21, the fuel passing through a fuel supply line 46 which extends from the afterburner control device 21 to the fuel supply inlet 32. A signal line 47 extends from the afterburner control device 21 to the signal inlet fitting SI. A squirt supply line 48 extends from the fuel supply line 20 to the squirt inlet 33 and pressure within this line also ranges from 765 to 785 p.s.i.

In the operation of the jet engine with the fuel-flow system of FIGURE 1, fuel flow is controlled by the throttle lever 13. When the throttle lever 13 is pivoted, it first opens the control valve 10 to the main burners of the jet engine. Fuel flow is restricted to the main burners until the throttle lever 13 has moved into an angle of 78 degrees, at which time the afterburner control device 21 is cut in to permit the flow of fuel under restricted pressure through the fuel supply line 46, with the result that fuel is delivered to inlet 32 of the valve 30. When the throttle lever 13 reaches a 98 degree position, fuel is supplied to the signal line 47 to control the operation of other portions of the fuel selector and flow divider valve 30, in a manner to be described hereinafter.

Referring now to FIGURE 2 in particular, it will be seen that the fuel selector and flow divider valve 30 has an internal fuel passage for delivering fuel to the outlets 34, 35, 36 and 37. The fuel passage includes a first section or portion having branches 49—49 and a second section or portion having branches 50—50. The first section 49 is divided from the second section with the flow therebetween being controlled by a valve unit, generally referred to by the numeral 51. Flow from the first section of the fuel passage into the primary sector outlet 34 is controlled by a valve unit, generally referred to by the numeral 52. A valve unit, generally referred to by the numeral 53, controls the flow of fluid from the first fluid passage section 49 into the secondary sector outlet 35. A valve unit, generally referred to by the numeral 54, controls the flow of fuel from the second fuel passage section into the primary uniform outlet 36, and a valve unit, generally referred to by the numeral 55, controls the flow of fuel from the second fuel passage section into the secondary uniform outlet 37.

The valve unit 52 is slidable in a casing bore 56 having a valve seat 57. The tubular valve member 58 of the unit 52 is disposed within the bore 56 and is mounted for movement longitudinally thereof. The valve member 52 is engageable with the valve seat 57 to prevent the flow of fuel through the unit into the primary sector outlet 34. The valve member 58 has suitable openings 59 which permit egress of fuel which may find its way into the interior thereof. The valve member 58 is urged to a closed position by a spring 60 with the spring 60 being overcome by fuel pressure on the valve member 58 when the fuel pressure reaches 61 p.s.i.

The valve unit 53 is slidable in a casing bore 61 having a valve seat 62. The hollow valve member 63 of the unit 53 is mounted within the bore 61 for movement longitudinally thereof to control the flow of fuel into the secondary sector outlet 35. The valve member 63 has openings 64 formed therein to permit the flow of fuel through the valve member 63 and into the secondary sector outlet 35 when the valve member 63 is unseated from the valve seat 62. The valve member 63 is urged to a closed position by an internally mounted coil spring 65. The opening pressure on the valve member 63 to overcome the coil spring 65 is 91 p.s.i. However, the valve member 63 is also urged to a closed position by means including an actuator rod 66 which is threaded therein and secured by means of a pin 66'. The operation of the actuator rod 66 will be described in greater detail hereinafter.

The valve unit 54 is slidable in a bore 67 having a valve seat 68. The tubular valve member 69 of the unit is mounted within the bore 67 and is urged to a closed position by a coil spring 70. The valve member 69 has suitable openings 71 therein through which fuel may flow when the valve member 69 is unseated. The valve member 69 opens at the same pressure as the valve member 58. The valve member 69, when opened, permits the flow of fuel therethrough and into the primary uniform outlet 36.

The valve unit 55 is slidable in a bore 72 which is connected to the secondary uniform outlet 37. The bore 72 has a valve seat 73 against which the tubular valve member 74 of the unit 55 seats when the valve member 74 is in a closed position. The valve member 74 is urged to a closed position by an internally positioned valve spring 75. The valve spring 75 is of a size to require the same opening pressure on the valve member 74 as that required to open the valve member 63. The valve member 74 is provided with suitable opennigs 76 to permit the flow of fuel therethrough into the secondary uniform outlet 37 when the valve member 74 is unseated from the valve seat 73.

The right portion of the housing 31 is provided with a cylinder 77 which is aligned with the valve unit 53. The cylinder 77 has a reduced extension 78 which opens into the first fuel passage section 49. A guide 79 is seated at the intersection of the cyilnder 77 and the cylinder extension 78. The actuating rod 66 for the valve member 63 extends into the cylinder extension 78 and has an enlarged head 80 slidably seated in a fitting 81 which is urged to the right by a coil spring 82. The coil spring 82 acting on the valve member 63 through the actuating rod 66 in cooperation with the spring 65 raises the opening pressure of the valve member 63 to 125 p.s.i.

A piston 83 is disposed within the cylinder 77 and is opposed in its movement to the left by a spring 84. A rod 85 guided by the guide 79 is connected to the piston 83 and is provided with a head 86 which is engageable with the fitting 81 to move the same to the left against the action of the spring 82. The signal pressure line 47 opens into the cylinder 77 at the signal inlet fitting SI to the right of the piston 83. Thus, when a signal pressure is admitted to the fuel selector and flow divider valve 30, it acts upon the piston 83 to move fitting 81 to the left out of engagement with head 80, at which time the effect of the spring 82 on the valve member 63 is removed and the valve member 63 is held closed by the spring 65, the opening pressure of the valve member 63 now being reduced from 125 p.s.i. to 91 p.s.i.

A second cylinder 87 is formed in the housing 31 in alignment with the valve unit 51. The cylinder 87 has a reduced extension 88. The valve unit 51 includes a valve member 89 which is slidably mounted in the cylinder extension 88 and which is engageable with a valve seat 90 to close the second fuel passage section 50 with respect to the first fuel passage section 49.

A guide 91 is seated within the cylinder extension 88 at the intersection of the cylinder extension 88 with the cylinder 87. A rod 92 is slidably mounted within the guide 91 and passes therethrough. The right end of the rod 92 is connected to a piston 93 positioned within the cylinder 87. The piston 93 is normally urged to the left by a spring 94 which has its right end seated in a spring retainer 95.

It is to be noted that the end of the valve member 89 projecting through the valve seat 90 has a vent passage 96 formed therein. The vent passage 96 is normally closed by a valve member 97 which is connected to the rod 92. There is a fuel leakage between the valve member 89 and the wall of the cylinder extension 88, with the result that the pressure within the valve member 89 is substantially the same as that around the valve member 89. However, when the valve member 97 is retracted to open the vent passage 96, the flow of fuel through the vent passage 96 is much greater than that of the fuel between the valve member 89 and the wall of the cylinder extension 88, with the result that the internal pressure within the cylinder extension 88 and the valve member 89 will be decreased and the valve member 89 will be moved to the right by the external pressure of fuel thereon within the fuel passage section 49.

A third cylinder 98 is formed in the lower right portion of the housing 31 as viewed in FIGURE 2. The cylinder 98 has an extension 99 of a reduced diameter extending to the left therefrom. A squirt valve, generally referred to by the numeral 100, is disposed in the left portion of the cylinder extension 99. The operation of the squirt valve 100 is controlled by an operator rod 101 which is guided by a guide 102 disposed within the cylinder extension 99 at the intersection of the cylinder extension with the cylinder 98. A piston 103 is disposed in the left hand part of the cylinder 98 and is connected to the operator rod 101 for reciprocating the same.

A spring retainer member 104 is disposed in the cylinder end to the right of the piston 103. A coil spring 105 is interposed between the member 104 and the piston 103 and serves to urge the piston to the left as viewed in FIGURE 2.

The squirt valve 100 includes a hollow valve member 106 which is slidably mounted in the cylinder extension 99 and engageable with the valve seat 107 to close the passage 108 leading to the fuel passage 50 from the squirt inlet 33 as shown in FIGURE 2. The left end of the hollow valve member 106 has a vent passage 109 extending therethrough and communicating between the hollow interior of the member 106 and the fuel passage 50. Bleed port means 110 in the valve member 106 permits bleeding of fuel from the squirt line 48 and inlet 33 into the interior of said valve member. A seat 111 is provided at the inner end of the vent passage 109 and the same is adapted to be engaged by the pilot valve 112 mounted for limited seating play at 113 on a reduced end portion of the rod 101.

Operation of the squirt valve 100 is under control of a pressure operated piston valve means generally designated 114, said valve means being responsive to pressure in the manifolds in a manner for assuring that each squirt cycle will extend only over an interval necessary to fill the manifolds, not overfill or underfill the same. The piston valve means comprises a casing 115 having a cylindrical bore 116 in which the valve body or plunger 117 is reciprocable, and a counterbore 118 forming a piston cylinder wherein the piston 119 is reciprocable. The piston cylinder or chamber is closed by a head 120 with which a pressure line 121 is connected, the line connecting in turn with the previously mentioned line 40 connected with the primary uniform outlet 36, thus providing for a feeding back of manifold pressure to be active in the piston chamber beneath the piston 119 as viewed in FIGURE 2, when dominant, to force the piston upwardly to the position illustrated in FIGURE 3. When the piston is in its fully lowered position it seats against the head 120 as shown in FIGURE 2, and when in its fully raised position said piston seats against the upper wall in the cylinder bore as shown in FIGURE 3.

By reference to FIGURES 2 and 3 of the drawings it will be apparent that a pressure line or passage 122 is provided and disposed to connect the cylinder 87 at a point between the guide 91 and the piston 93 with the cylinder 98 at a point between the spring retainer 104 and the piston 103 and that a pressure line or passage 123 is provided and disposed to connect the cylinder 87 at a point between the piston 93 and the spring retainer 95 with the cylinder 87 at a point between the piston 93 and the spring retainer 95 with the cylinder 98 at a point between the piston 103 and the guide 102.

The valve bore 116 is traversed by five annular flow chambers spaced along the axis of the bore and designated 124, 125, 126, 127 and 128 respectively, and the valve body or plunger has an intermediate land 129, an upper end land 130, and a lower land 131, there also being two reduced diameter portions, one 132 intermediate the lands 129 and 130, and the other 133 intermediate the lands 129 and 131, said portions 132 and 133 serving to provide selective pressure flow clearances.

A pressure line or duct 134 communicates between the pressure passage 122 and the annular flow chamber or clearance 127, and a similar line or duct 135 communicates between the pressure passage 123 and the annular flow chamber or clearance 125. The endmost annular flow chambers 124 and 128 are connected by a duct 137 which is in turn connected by a connecting line or duct 138 with the reference pressure line 43, as shown in FIGURE 1. The centrally disposed annular flow chamber or clearance 126 is connected by a connecting line or duct 139 with the signal pressure line 47, as shown in FIGURE 1.

The valve body or plunger 117 has a center bore 140 opening through its upper end into the bore 116 and at its lower end, through ports 141 into the cylinder or counterbore 118 above the piston 119. A compression spring 142 interposed between the upper end of the plunger 117 and a spring retainer or closure cap 143 constantly urges the plunger 116 toward its lowered position shown in FIGURE 2.

A duct 144 connecting with the cap 143 provides a tail pipe pressure connection at 145 with the afterburner as shown in FIGURES 1 and 2. This tail pipe pressure connection 140–141–144 is employed to provide a low pressure side (5–6 p.s.i.) for differential pressure on the piston 119 and thus prevent hydraulic lock due to leakage from the high pressure side. This also provides the lowest available reference pressure and assures the greatest sensitivity to changes in pressure on the high pressure side beneath the piston 119.

Operation

Only the control valve 10 is affected by movement of the throttle lever through an angle of 78 degrees. When the angle of the throttle lever 13 passes beyond the 78 degree point, the afterburner control device 21 is actuated to permit fuel under a limited pressure to pass into the fuel supply line 46 with the fuel entering into the first fuel passage sections 49. When the pressure of the fuel within the first fuel passage section 49 reaches 61 p.s.i., the valve unit 52 opens to admit fuel to the primary sectors 26 of the afterburner manifold 25 through the fuel lines 38. As the afterburner control device 21 continues to open, depending upon the position of the lever 22 and the operation of the compressor 44, the pressure of the fuel supplied the fuel selector and flow divider valve 30 will increase. When the pressure reaches 125 p.s.i., the valve unit 53 will open against the combined action of the springs 65 and 82 to admit fuel to the secondary sectors 27 of the afterburner manifold 29 through the fluid line 39. Fuel, however, is prevented from entering into the second fuel passage sections 50 by the valve unit 51.

When the throttle lever 13 reaches the 98 degree position, the afterburner control device 21 opens the valve controlling flow of signal fluid through the signal line 47. Thus signal fluid at a pressure of 765 to 785 p.s.i. is delivered to the signal inlet SI. Line 47, prior to receiving signal pressure, is under the reference pressure of 20 to 30 p.s.i. The pressure of the signal fluid moves the piston 83 to the left causing the head 86 to displace the fitting 81 from its contact with the rod head 80, thus relieving the effect of the spring 82 on the valve member 63 and reducing the opening pressure of the valve member 63 to 91 p.s.i.

At the time that that signal pressure is applied through the signal inlet SI, lines 40, 41 leading to the afterburner manifold sections 28, 29 will contain substantially no fuel. Likewise, the second fuel passage sections 50 will contain substantially no fuel.

It will be apparent by reference to FIGURE 2 that at this time the piston valve means 114 is in the position illustrated in FIGURE 2 directing signal pressure from the line 139 to the chamber at the right of the piston 93 of the valve means 51 and into the space at the left of the squirt valve piston 103, and reference pressure from the line 138 into the space to the left of the piston 93 and into the chamber to the right of the piston 103. The signal pressure thus directed holds the valve member 97 against its seat in the valve member 89 and the latter on its seat 90, and it also acts on the piston 103 to force it to the right and bring about an unseating of the pilot valve 112, releasing pressure from within the squirt valve 100 and permitting squirt pressure about the valve 100 to unseat the same and direct squirt fluid into the second fuel passages 50 so as to rapidly fill the lines 40, 41 and the associated afterburner. This is accomplished by pressure opening of the valves 54 and 55 against the action of their seating springs 70 and 75 respectively.

Even though primary uniform valve 54 has a lower opening pressure (61 p.s.i.) than the secondary uniform valve 55 (91 p.s.i.) the pressure below the squirt valve 100 builds up very rapidly and exceeds 90 p.s.i. within a fraction of a second after the valve 54 opens so that both the primary and secondary uniform manifolds will be filling simultaneously. The proportions for valve 55 are so worked out that it will pass an amount of fuel in proportion to that passed by valve 54 so that the filling of the secondary uniform manifold by squirt approximates that of the filling of the primary uniform manifold by squirt.

Each manifold filling by the described squirt fuel introduction causes a pressure build up in the line 121 effective to shift the piston valve 119–117 from its lowered FIGURE 2 position to its elevated FIGURE 3 position.

Upon shifting of the piston valve 119–117 to the FIGURE 3 position signal pressure from the line 139 will be directed into the chamber to the right of the piston 103 to bring about a seating of the squirt valve 100, and into the space to the left of the piston 93 to first unseat the pilot valve 97 followed by a pressure opening of the valve 89 to admit inlet pressure into the passages 50. Reference pressure will be directed by the raising of the piston valve into the FIGURE 3 position from the line 138 into the space to the left of the piston 103 and into the chamber to the right of the piston 93, thus reversing the signal and reference pressure directions in FIGURE 3 as compared to the previously effective directions in FIGURE 2.

While a preferred arrangement of controls has been disclosed herein it is to be understood that variations in unit and part arrangements may be made without departing from the spirit and scope of the invention as defined in the appended claims.

I claim:

1. In a fuel system for supplying fuel to a jet engine afterburner manifold of the type divided into sections including at least one sector and one uniform, a first fuel supply means of the variable pressure type connected to the manifold for supplying fuel to the manifold during the operation of the afterburner, a second fuel supply means of a generally constant high pressure connected to the manifold uniform for filling the manifold uniform with fuel prior to the supplying of fuel to the manifold uniform from the first fuel supply means, and pressure responsive control means including a first valve means for controlling fluid flow from said first fuel supply means to said manifold uniform, and a second valve means for controlling fluid flow from said second fuel supply means to said manifold uniform, signal pressure means, said signal pressure means controlling said first and second valve means to open said second valve means and hold said first valve means closed, and said signal pressure means being selectively operable to hold said second valve means closed and simultaneously allow said first valve means to open.

2. In a fuel system for supplying fuel to a jet engine afterburner manifold of the type divided into sections including at least one sector and one uniform, a high pressure fuel supply, first flow control means of the variable pressure type connecting the high pressure fuel supply to the manifold and controlling the supplying of fuel to the manifold during the operation of the afterburner, second flow control means connecting the high pressure fuel supply to the manifold uniform for filling the manifold uniform prior to the operation of the first flow control means to supply fuel to the manifold uniform with fuel delivered at a higher pressure than that delivered by said first flow control means, and control means connected to the manifold uniform and the second flow control means and operable in response to fuel pressure within the manifold uniform for preventing the operation of the second flow control means to supply fuel to the manifold uniform whenever the manifold uniform is full, said first flow control means including a pressure responsive valve, signal pressure means, said signal pressure means controlling said control means to open said second flow control means and hold said pressure responsive valve closed, and said signal pressure means being selectively operable to hold said second flow control means closed and simultaneously allow said pressure responsive valve to open.

3. In a fuel system for supplying fuel to a jet engine afterburner manifold of the type divided into sections including at least one sector and one uniform, a first fuel supply having a variable pressure and a second fuel supply having a substantially constant high pressure, first flow control means connecting the first fuel supply to the manifold and controlling the supplying of fuel to the manifold during the operation of the afterburner, second flow control means connecting the second fuel supply to the manifold uniform for filling the manifold uniform prior or to the operation of the first flow control means to supply fuel to the manifold uniform from the first fuel supply, and control means connected to the manifold uniform and the second flow control means and operable in response to fuel pressure within the manifold uniform for preventing the operation of the second flow control means to supply fuel to the manifold uniform whenever the manifold uniform is full, said first flow control means including a pressure responsive valve, signal pressure means, said signal pressure means controlling said control means to open said second flow control means and hold said pressure responsive valve closed, and said signal pressure means being selectively operable to hold said second flow control means closed and simultaneously allow said pressure responsive valve to open.

4. In a fuel system for supplying fuel to a jet engine afterburner manifold of the type divided into sections including at least one sector and one uniform, a fuel supply, first control means connecting the fuel supply to the manifold for selectively supplying fuel to the manifold sections during the operation of the afterburner, and second control means connecting the fuel supply to the manifold uniform and operable to supply fuel to the manifold uniform only to an extent for filling the manifold uniform prior to the operation of the first control means to supply fuel to the manifold uniform, said first control means including a pressure responsive valve for isolating said sector from said uniform, signal pressure means, said signal pressure means being operable to open said second control means and hold said pressure responsive valve closed, and said signal pressure means being selectively operable to hold said second control means closed and simultaneously allow said pressure responsive valve to open.

5. In a fuel system for supplying fuel to a jet engine afterburner manifold of the type divided into sections including at least one sector and one uniform, a first fuel supply and a second fuel supply, first control means connecting the first fuel supply to the manifold for selectively supplying fuel to the manifold sections during the operation of the afterburner, and second control means connecting the second fuel supply to the manifold uniform and operable to supply fuel to the manifold uniform only to an extent for filling the manifold uniform prior to the operation of the first control means to supply fuel to the manifold uniform, said first control means including a pressure responsive valve, signal pressure means, said signal pressure means being operable to open said second control means and hold said pressure responsive valve closed, and said signal pressure means being selectively operable to hold said second control means closed and simultaneously allow said pressure responsive valve to open.

6. In a fuel system for supplying fuel to a jet engine afterburner manifold of the type divided into sections including at least one sector and one uniform, a fuel supply, first control means connecting the fuel supply to the manifold for selectively supplying fuel at controlled varied pressures to the manifold sections during the operation of the afterburner, and second control means connecting the fuel supply to the manifold uniform at substantially the full pressure of said fuel supply to fill the manifold uniform with fuel prior to the operation of the first control means to supply fuel to the manifold uniform, the second control means including means responsive to pressure within the manifold uniform for preventing the operation of the second control means to supply fuel to the manifold uniform whenever the manifold is full, said first control means including a pressure responsive valve isolating said sector from said uniform, signal pressure means, said signal pressure means being operable to open said second control means and hold said pressure responsive valve closed, and said signal pressure means being selectively operable to hold said second control means closed and simultaneously allow said pressure responsive valve to open.

7. In a fuel system for supplying fuel to a jet engine afterburner manifold of the type divided into sections including at least one sector and one uniform, a first fuel supply having a variable pressure and a second fuel supply having a substantially constant high pressure, first control means connecting the first fuel supply to the manifold for selectively supplying fuel to the manifold sections during the operation of the afterburner, and second control means connecting the second fuel supply to the manifold uniform to fill the manifold uniform with fuel prior to the operation of the first control means to supply fuel to the manifold uniform from the first fuel supply, the second control means including means responsive to pressure within the manifold uniform for preventing the operation of the second control means to supply fuel to the manifold uniform whenever the manifold is full, said first control means including a valve isolating said sector from said uniform, signal pressure means, said signal pressure means being operable to open said second control means and hold said valve closed, and said signal pressure means being selectively operable to hold said second control means closed and simultaneously allow said valve to open.

8. In a fuel system for supplying fuel to a jet engine afterburner manifold of the type divided into sections including at least one sector and one uniform, a first fuel supply means connected to the manifold for supplying fuel to the manifold during the operation of the afterburner, a second fuel supply means connected to the manifold uniform for filling the manifold uniform with fuel prior to the supplying of fuel to the manifold uniform from the first fuel supply means, and control means connected to the second fuel supply means and to the manifold uniform for controlling the flow of fuel into the manifold uniform from the second fuel supply means in accordance with the condition of fuel fill in the manifold uniform, the second fuel supply including a squirt valve operable through a cycle in its delivery of fuel to the manifold uniform, and the control means being responsive to fuel pressure within the manifold uniform and effective to time the fuel delivery cycle of the squirt valve to prevent delivery when the manifold uniform is full and cause delivery only over a period necessary to bring the manifold uniform to a full condition.

9. In a fuel system for supplying fuel to a jet engine afterburner manifold of the type divided into sections including at least one sector and one uniform, a first fuel supply means connected to the manifold for supplying fuel to the manifold during the operation of the afterburner, a second fuel supply means connected to the manifold uniform for filling the manifold uniform with fuel prior to the supplying of fuel to the manifold uniform from the first fuel supply means, and control means connected to the second fuel supply means and to the manifold uniform for controlling the flow of fuel into the manifold uniform from the second fuel supply means in accordance with the condition of fuel fill in the manifold uniform, the second fuel supply including a squirt valve operable through a cycle in its delivery of fuel to the manifold uniform, and the control means being responsive to fuel pressure within the manifold uniform and effective to time the fuel delivery cycle of the squirt valve to extend only over an interval necessary to fill the manifold uniform, not underfill or overfill the same.

10. In a fuel system for supplying fuel to a jet engine afterburner manifold of the type divided into sections including at least one sector and one uniform, a first fuel supply means connected to the manifold for supplying fuel to the manifold during the operation of the afterburner, a second fuel supply means connected to the manifold uniform for filling the manifold uniform with fuel prior to the supplying of fuel to the manifold uniform from the first fuel supply means, and control means connected to the second fuel supply means and to the manifold uniform for controlling the flow of fuel into the manifold uniform from the second fuel supply means in accordance with the condition of fuel fill in the manifold uniform, the second fuel supply including a squirt valve operable through a cycle in its delivery of fuel to the manifold uniform, and the control means including piston operated valve means and actuating pressure sources controlled thereby and effective to time the fuel delivery cycle of the squirt valve to prevent delivery when the manifold uniform is full and cause delivery only over a period necessary to bring the manifold uniform to a full condition.

11. In a fuel system for supplying fuel to a jet engine afterburner manifold of the type divided into sections including at least one sector and one uniform, a first fuel supply means connected to the manifold for supplying fuel to the manifold during the operation of the afterburner, a second fuel supply means connected to the manifold uniforms for filling the manifold uniform with fuel prior to the supplying of fuel to the manifold uniform from the first fuel supply means, and control means connected to the second fuel supply means and to the manifold uniform for controlling the flow of fuel into the manifold uniform from the second fuel supply means in accordance with the condition of fuel fill in the manifold uniform, the second fuel supply including a squirt valve operable through a cycle in its delivery of fuel to the manifold uniform, and the control means including piston operated valve means and actuating pressure sources controlled thereby and effective to time the fuel delivery cycle of the squirt valve to prevent delivery when the manifold uniform is full and cause delivery only over a period necessary to bring the manifold uniform to a full condition, the piston of said piston operated valve means being operable in one direction by manifold uniform pressure and in an opposite direction by tail pipe pressure.

12. In a fuel system for supplying fuel to a jet engine afterburner manifold of the type divided into sections including at least one sector and one uniform, a first fuel supply means connected to the manifold for supplying fuel to the manifold during the operation of the afterburner, a second fuel supply means connected to the manifold uniform for filling the manifold uniform with fuel prior to the supplying of fuel to the manifold uniform from the first fuel supply means, and control means connected to the second fuel supply means and to the manifold uniform for controlling the flow of fuel into the manifold uniform from the second fuel supply means in accordance with the condition of fuel fill in the manifold uniform, the second fuel supply including a squirt valve means operable through a cycle to deliver fuel to the manifold uniform, and the control means including piston operated valve means and actuating pressure sources controlled thereby, the piston of the piston operated valve means being operable by tail pipe pressure to position the piston operated valve means for directing actuating pressure to bring about a fuel insquirting action of the squirt valve, and by manifold uniform pressure to position said control valve means to so control actuating pressure as to discontinue the squire cycle as soon as the manifold is filled.

13. In a fuel system for supplying fuel to a jet engine afterburner manifold of the type divided into sections including at least on sector and one uniform, a first fuel supply means connected to the manifold for supplying fuel to the manifold during the operation of the afterburner, a second fuel supply means connected to the manifold uniform for filling the manifold uniform with fuel prior to the supplying of fuel to the manifold uniform from the first fuel supply means, control means connected to the second fuel supply means and to the manifold uniform for controlling the flow of fuel into the manifold uniform from the second fuel supply means in accordance with the condition of fuel fill in the manifold uniform, said second fuel supply including a squirt valve operable through a cycle in its delivery of fuel to the manifold uniform, said squirt valve including a piston type operator; and said control means including a reference fluid source, a signal fluid source of pressure different from said reference fluid pressure, and a control valve for selectively delivering said reference fluid and said signal fluid to opposite sides of said piston type operator.

14. The fuel system of claim 13 wherein said control valve includes a piston acted on in one direction by manifold uniform pressure and in an opposite direction by tail pipe pressure.

15. The fuel system of claim 13 wherein said first fuel supply means includes a fuel supply valve of the piston operated type operable by said reference fluid and said signal fluid and controlled by said control valve.

16. The fuel system of claim 13 wherein said first fuel supply means includes a fuel supply valve of the piston operated type operable by said reference fluid and said signal fluid and controlled by said control valve, the connections of said squirt valve and said fuel supply valve to said control valve being crossed whereby only one of said squirt valve and said fuel supply valve is open at a time.

17. In a fuel system for supplying fuel to a jet engine afterburner manifold of the type divided into sections including at least one sector and one uniform, a fuel supply, first control means connecting the fuel supply to the manifold for selectively supplying fuel to said sector and uniform at different pressures during the operation of the afterburner, and second control means connecting the fuel supply to the manifold uniform at substantially the full pressure of said fuel supply to fill the manifold uniform with fuel prior to the operation of the first control means to supply fuel to the manifold uniform, the second control means including means responsive to pressure within the manifold uniform for preventing the operation of the second control means to supply fuel to the manifold uniform whenever the manifold is full, said first control means including a pressure actuated valve downstream of said second control means.

References Cited by the Examiner

UNITED STATES PATENTS 2,845,079    7/58    Hutton _____ 158—36
2,937,501    5/60    Trousse _____ 60—39.14
2,938,341    5/60    Miller _____ 60—39.28

SAMUEL LEVINE, *Primary Examiner.*